United States Patent
Bremer et al.

(10) Patent No.: US 6,555,014 B1
(45) Date of Patent: Apr. 29, 2003

(54) METHOD FOR FILTERING A LIQUID BY THE ADDITION OF A FILTERING AID

(75) Inventors: Karl-Guenter Bremer, Eschweiler (DE); Karl-Heinz Buehl, Aachen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/555,739

(22) PCT Filed: Dec. 3, 1998

(86) PCT No.: PCT/EP98/07846

§ 371 (c)(1),
(2), (4) Date: Aug. 1, 2000

(87) PCT Pub. No.: WO99/29396

PCT Pub. Date: Jun. 17, 1999

(30) Foreign Application Priority Data

Dec. 4, 1997 (DE) .......................................... 197 53 717

(51) Int. Cl.[7] .............................................. B01D 37/02
(52) U.S. Cl. ...................... 210/777; 210/778; 210/783; 210/193; 210/400; 210/406
(58) Field of Search ................................ 210/777, 778, 210/193, 783, 400, 406

(56) References Cited

U.S. PATENT DOCUMENTS

| | | | | | |
|---|---|---|---|---|---|
| 1,284,750 A | * | 11/1918 | Munro | .................... | 210/778 |
| 1,579,171 A | * | 3/1926 | Zoul | ..................... | 210/778 |
| 2,455,130 A | * | 11/1948 | Lomax | .................... | 210/778 |
| 3,674,686 A | * | 7/1972 | Brimmer et al. | ............ | 210/778 |
| 4,454,044 A | * | 6/1984 | Klein | ..................... | 210/778 |
| 4,507,208 A | * | 3/1985 | Simon et al. | ............... | 210/778 |
| 4,510,061 A | * | 4/1985 | White | .................... | 210/777 |
| 5,062,968 A | * | 11/1991 | Warning | ................. | 210/778 |
| 5,300,234 A | * | 4/1994 | Oechsie et al. | ............. | 210/778 |
| 5,449,464 A | * | 9/1995 | El-Shall | .................. | 210/778 |
| 5,908,561 A | * | 6/1999 | Palm et al. | ................. | 210/778 |

OTHER PUBLICATIONS

U.S. Patent Classification Definitions; Class 210 Liquid Purification of Separation; Jun. 1994; p. 210–297.*
Perry's Chemical Engineers' Handbook—Sixth Edition pp. 19–72 and 19–73, 1984.*

* cited by examiner

Primary Examiner—Robert J. Popovics
(74) Attorney, Agent, or Firm—Crowell & Moring LLP

(57) ABSTRACT

A method for filtering a liquid and an apparatus for carrying out the method in which at least one container is provided from which a filtering aid is fed to a dosing device by a delivery device, and the filter aid is supplied to an injecting container and/or to a filter element via the dosing device.

7 Claims, 2 Drawing Sheets

METHOD FOR FILTERING A LIQUID BY THE ADDITION OF A FILTERING AID

BACKGROUND OF THE INVENTION

The invention relates to a method for filtering a liquid, in which at least one filtering aid is added to the dirty liquid to be filtered and a higher degree of purity is achieved.

A method for cleaning liquid cooling lubricants is known from the German patent 35 37 384. For this method, a pre-coated filter is disposed in a cycling system and filtering aids with a highly surface-active and adsorbing substance are used in the pre-coated filter. These filtering aids are, for example, conventional commercial fuller's earths. It is a disadvantage of the system that, to begin with, a filter cake of the filtering aid must be built up, so that a sufficient degree of filtration results. It must therefore be expected that the input of filtering aid will be high. A further disadvantage can be seen therein that a precise dosing of the pre-coating layer is a problem because of turbulences and that the filtration result is therefore subject to high fluctuations under some circumstances.

SUMMARY OF THE INVENTION

It is an object of the invention, to provide a method and an apparatus for filtering a liquid, for which the amount of filtering aid used is to be minimized and a high filtration quality is to be achieved in filtration plants.

This objective is accomplished by the by the method and apparatus as described and claimed hereinafter.

The advantage of the method lies therein that an initial pre-coating is not required. Instead, filtering aid is added to the dirty liquid that is to be filtered. By these means, a high degree of purity can be achieved.

According to a refinement of the invention, it is proposed that the open-pore character be assured by appropriately dosing the filtering aid. For this measure, especially an appropriate particle size of the filtering aid or an appropriate compression strength of the filtering aid is especially important for avoiding any caking.

According to a refinement of the invention, the filtering aid can be dosed in continuously or discontinuously. The inoculation advantageously is discontinuous if the input of dirt is very low or if the service life of a filtration plant is to be prolonged. Filtering aids can also be added when the plant is not in operation and it is only necessary to maintain the quality of the liquid.

Pursuant to a further development of the invention, the filtering aid is pre-mixed with the dirt components or with the dirty liquid, so that a better distribution of the filtering aid takes place. Advantageously, either crushed corn or also cellulose can be used. Especially the inoculation with cellulose achieves a filtration quality, which is better than that achieved with the previously used pre-coating with diatomaceous earth or fuller's earth. Since it is injurious to health, special diatomaceous earth should be avoided in the future.

The fact that the residue can be disposed of easily is a further advantage of the use of crushed corn or cellulose. Cellulose, for example, burns almost without leaving any residue.

It has turned out that the invention can be employed advantageously in different filtration plants. The filtering aid increases the lifetime of the liquid, for example, of an emulsion. In addition, a degree of filtration of less than 15 $\mu$ is achieved. The filtration plants include, for example, gravity belt filtration plants, pressure belt filtration plants or vacuum filtration plants.

In a further variation of the method, a filtration plant is pre-coated only partially, that is, the filtering aid covers only a certain region of the effective filter surface.

As a result, a sort of partial flow filtration results. The essential advantage is seen therein that two filters can be integrated into a single filtration system. Likewise, it is possible to carry out the pre-coating at different densities. By these means also, filters with different degrees of filtration are formed.

An additional variant of the invention is represented by the basic pre-coating of the filtering aid. In this variant, initially only the filtering aid is introduced. Subsequently, the dirty liquid is added. This basic pre-coating has the advantage that a high degree of filtration is achieved at the very start of the filtration process. Quite generally, the invention exhibits the following improvements in comparison to previously known methods:

reduction in the consumption of filtering aid;
avoidance of the use of filtering aids, injurious to health, such as diatomaceous earth in pre-coated filtration plants;
increase in the quality of the filtration;
replacement of pre-coated filtration plants as state of the art technology for high-degree and very high-degree filtration requirements when cooling lubricants are used, both in the case of oil as well as in the case of suspensions;
the possibility of working up spent oils;
prolonging the maintenance interval for cooling lubricants;
reducing the costs of cleaning storage containers for cooling lubricants;
reducing the problem of disposing of waste materials;
reducing the costs of the disposal.

These and further distinguishing characteristics of preferred further developments of the invention are evident from the claims as well as from the specification and the drawings. The individual distinguishing features can be realized by themselves alone or in the form of subcombinations of several for the embodiment of the invention and in other fields and represent advantageous, patentable developments, for which protection is claimed here.

BRIEF DESCRIPTION OF THE DRAWINGS

The invention will be described hereinafter with reference to working examples. In the drawings

DETAILED DESCRIPTION OF PREFERRED EMBODIMENTS

Figure 1:
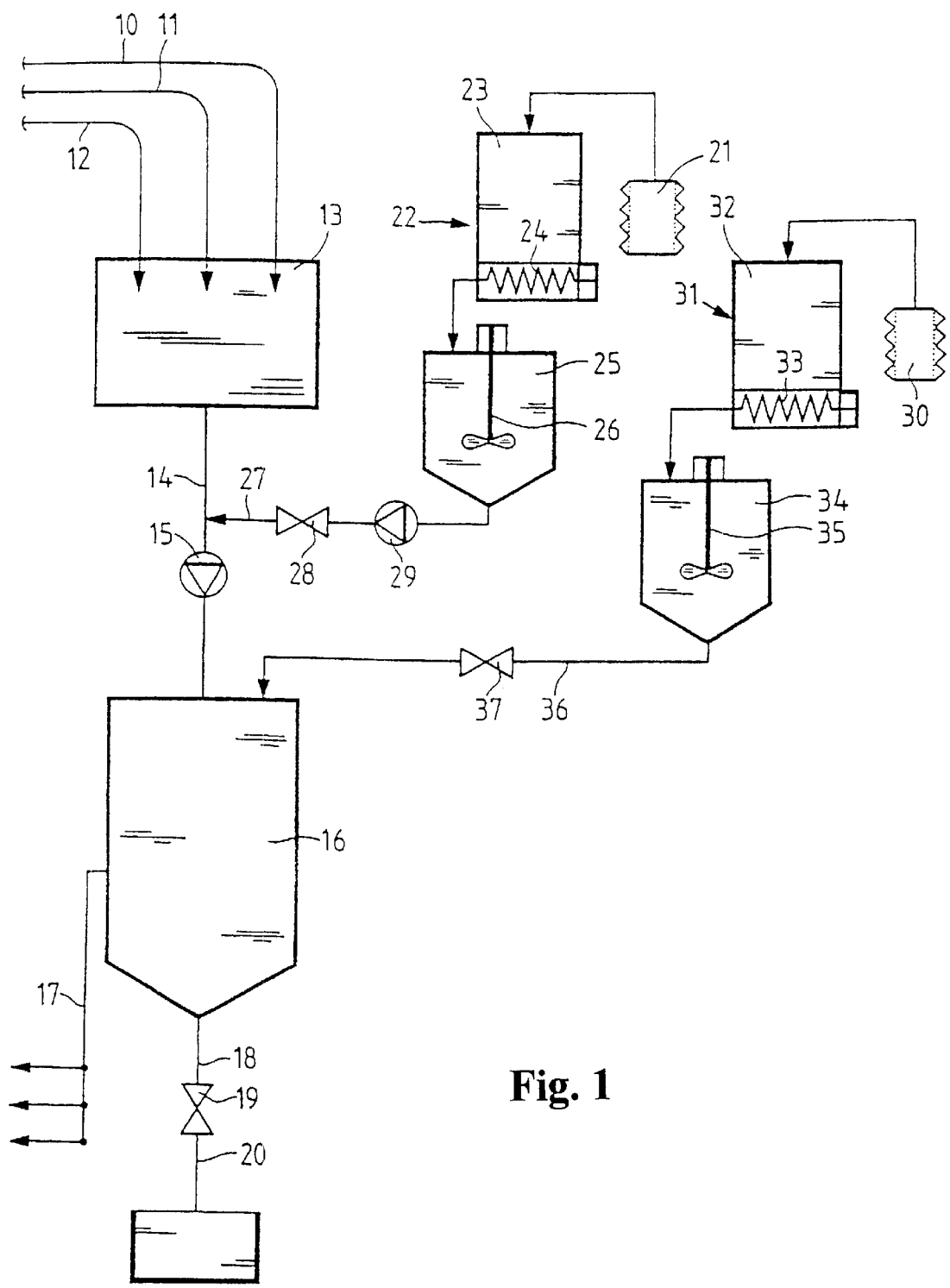
FIG. 1 shows the diagrammatic construction of a plant for purifying liquid cooling lubricants.

FIG. 1 shows the diagrammatic construction of a plant for purifying liquid cooling lubricants. The cooling lubricant, supplied by machine tools, which are not shown here, and contaminated with chips, turnings, slivers and other impurities, is passed into a dirty container 13 via pipelines 10, 11,12. From this dirty container 13, the liquid passes through pipeline 14 and a pump 15 into a pre-coated filtration plant 16. Usually, there are several cartridge filters in a precoated filtration plant. Such a pre-coated filtration plant is known, for example, from DE 29 08 625 A1.

The purified liquid leaves the plant through pipeline 17 and can be returned once again to the machine tools by way of a clean tank and possibly additional pumps. A pipeline 18 and a valve 19 are disposed at the discharge opening of the pre-coated filtration plant 16. When the valve 19 is opened, the dirt and the filtering aid are pumped into a container 20.

A filtering aid for the basic pre-coating, such as cellulose, passes from a container 21 into a delivering device 22. This delivering device has dosing equipment 23 and a screw conveyor 24. From here, the filtering aid is dosed into a container 25, which is filled with oil or suspension. The filtering aid and the liquid are mixed with a stirrer 26. This means that, at the start of the filtration, initially the basic pre-coating is prepared and pumped to the filter. At the end of the basic pre-coating, the pre-coated filtration plant is ready to function. During the normal filtration cycle, oil inoculation substance is added continuously or also discontinuously via pipeline 27 and valve 28 together and simultaneously with the filtration cycle from the inoculation container 25 to the filtration cycle, that is, oil inoculation substance is inoculated continuously or discontinuously with an inoculation pump 29 into the filtration cycle. In order to avoid unnecessary expenditure of energy, this is done preferably by injecting the inoculation substance via pipeline 27 into the pipeline 14.

Due to the inoculation method, the dirty liquid, pumped through the filter cartridges, is mixed constantly with inoculating substance, so that a mixture, consisting of inoculating pre-coating agent and dirt, is formed on the filter cartridges. Owing to the fact that inoculating pre-coating substance is inoculated continuously or discontinuously during the filtration, the porosity of the deposits on the filter cartridges is increased and the property of the coating improved, so that the filtration is very effective and of a high quality. Likewise, the service life is clearly prolonged by the inoculation.

To form a basic pre-coating, the basic pre-coating agent, as is shown in the Figure, is provided in a container 30 and supplied from there to transporting equipment 31, consisting of dosing equipment 32 and a screw conveyor 33. The screw conveyor transports the basic pre-coating into the container 34, which contains the oil or the suspension. With the stirrer 35, the basic pre-coating is mixed with the oil or suspension and supplied via pipeline 36 and valve 37 to the pre-coated filtration plant before the start of the filtration process. At the same time, the basic pre-coating is deposited on the filter cartridge and forms a first filtration layer.

Due to the subsequent inoculation of the dirty liquid supplied, a better quality of cooling lubricant is achieved, that is, the degree of purity of the cooling lubricants is increased.

Figure 2:
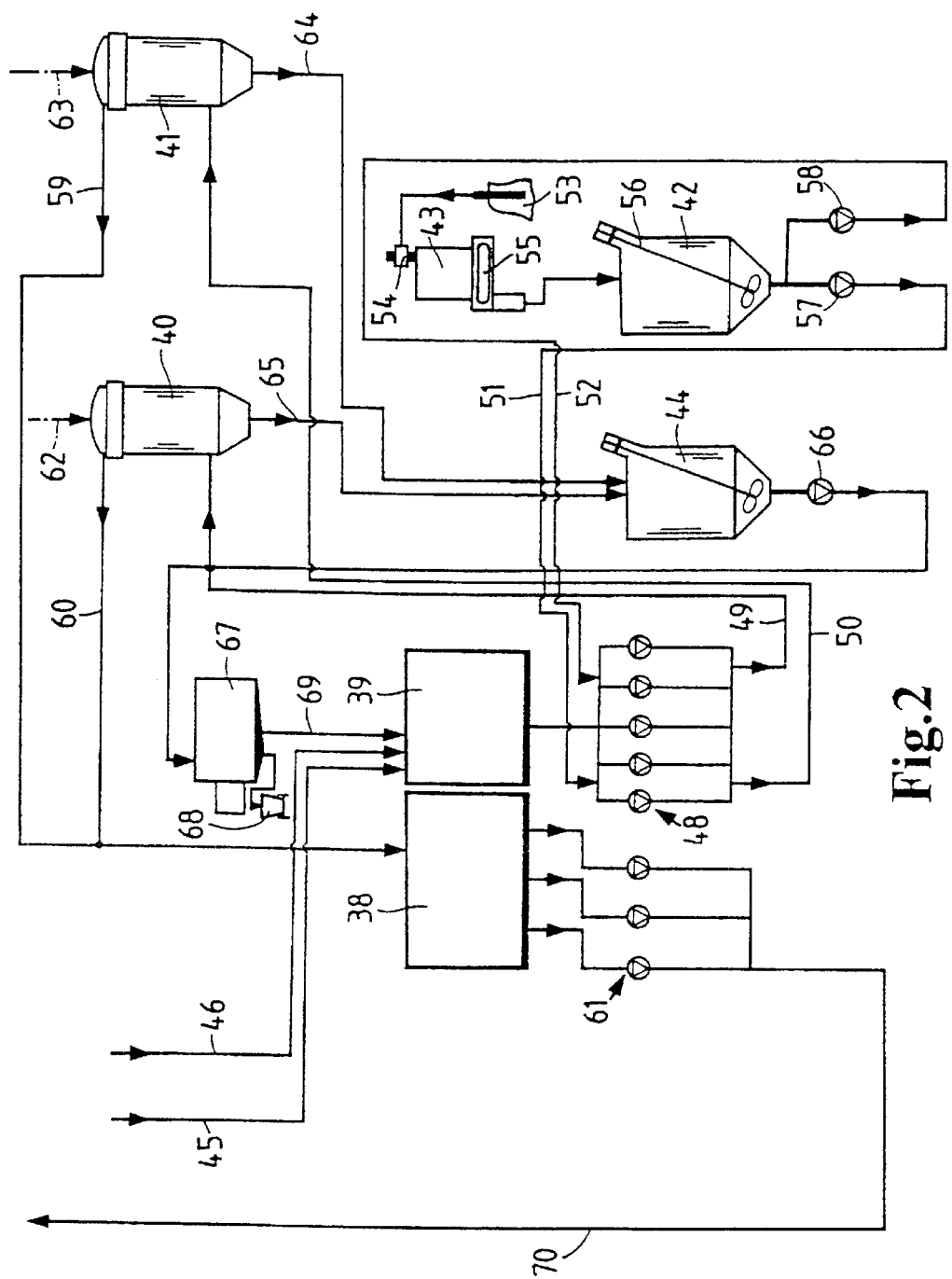
FIG. 2 shows a variation of a plant for purifying liquid cooling lubricants.

The variant of FIG. 2 shows a construction, in which certain parts of the plant, such as the filtering equipment or certain conveying pumps, are constructed in duplicate. The plant consists of a clean container 38, which contains the purified cooling lubricant, a dirty container 39, two filtration devices 40, 41, an inoculation device consisting of an inoculation container 42, a dosing device 43, a pre-coating container 44 as well as an appropriate complement of pumps and pipelines. The cooling lubricant, which is to be cleaned, passes from machine tools, which are not shown here, via pipelines 45, 46 to a dirty container 39. The dirty liquid is pumped via several pumps 48 and the pipelines 49, 50 to the two filtration devices 40, 41. Filtering aid is supplied to the suction side of these pumps 48 through pipelines 51, 52. The filtering aid, such as crushed corn, is made available in a container 53 and, from there, reaches the inoculation container 42 via conveying equipment 54 and a screw conveyor 55. The inoculation container contains clean liquid. The filtering aid is mixed with the clean liquid in this container. For this purpose, a mixer 56 is provided.

As already mentioned, the clean liquid with the filtering aid passes through conveying pumps 57, 58 and pipelines 51, 52 into the suction side of the pumps 48. The dirty liquid, now mixed with the filtering aid, is supplied to the filtration devices 40, 41. In the filtration devices, filter cartridges, for example, are disposed, which have a certain filter fineness and on which the dirt is deposited. The purified liquid passes through pipelines 59, 60 into the clean container 38 and can be conveyed from there by pumps 61 and pipeline 70 to the appropriate machine tools. For cleaning the filtration devices 40, 41, compressed air is supplied via pipelines 62, 63. This compressed air displaces the clean liquid and, at the same time, extracts moisture from the filter cake, which is formed by the filtration. The filter cake is passed through pipelines 64, 65 to a washing container 44. The dirt is discharged from the washing container with pumps 66 into a pressure belt filter 67. This pressure belt filter separates the remaining moisture from the sludge. The sludge is discharged into the container 68, and the remaining liquid passes through pipeline 69 into the dirty container 39.

Of course, different systems can be used for the filtration. For example, the possibility exists of using gravity filtration or vacuum filtration. In the case of vacuum filtration, the filtering aid is deposited on an endless belt. This endless belt passes through the filter container. The dirt, deposited on the belt, is removed by appropriate scraping equipment.

Filtering aid can also be charged even when no dirt is being charged. This is for the purpose of maintenance filtration, which is required particularly on weekends, and thereby makes possible a longer useful life of the cooling lubricant.

What is claimed is:

1. A method for filtering a dirty liquid with a filter element to separate dirt components from the liquid, comprising the steps of:

using a conveyor and a metering screw to deliver filtering aid to an inoculation container, wherein the filtering aid includes at least one of crushed corn and cellulose;

mixing a clean liquid with the filtering aid in the inoculation container with a mixer;

with an inoculation pump, adding the mixture of clean liquid and filtering aid to the dirty liquid that is to be filtered through a conduit through which the dirty liquid is delivered to a filtration plant;

passing the dirty liquid containing filtering aid directly to a filter element surface to obtain a filtered liquid; and whereby a higher degree of purity of the filtered liquid and a longer service life of the liquid are achieved.

2. The method of claim 1, wherein the filtering aid is added discontinuously.

3. The method of claim 1, wherein the filtering aid is added continuously.

4. The method of claim 1, wherein the filtering aid and dirty liquid are mixed before the filtration process.

5. The method of claim 1, wherein the filtration is carried out in a gravity belt filtration plant, a pressure belt filtration plant or a vacuum filtration plant.

6. The method of claim 5, wherein the filtering aid is partially added in a defined region of the filter and thereby a partial flow filtration is realized.

7. The method of claim 1, wherein the dirty liquid is a machine tool coolant lubricant.

* * * * *